US008658015B2

(12) United States Patent
Hou (10) Patent No.: US 8,658,015 B2
(45) Date of Patent: Feb. 25, 2014

(54) WATER TREATMENT DEVICE AND METHOD

(71) Applicant: Hongji Hou, Linfen (CN)

(72) Inventor: Hongji Hou, Linfen (CN)

( * ) Notice: Subject to any disclaimer, the term of this patent is extended or adjusted under 35 U.S.C. 154(b) by 7 days.

(21) Appl. No.: 13/655,569

(22) Filed: Oct. 19, 2012

(65) Prior Publication Data

US 2013/0056355 A1 Mar. 7, 2013

(51) Int. Cl.
*C02F 1/48* (2006.01)
*C02F 5/00* (2006.01)

(52) U.S. Cl.
USPC ............ 204/557; 210/222; 210/695; 204/660

(58) Field of Classification Search
USPC .................................. 204/557; 210/222, 695
See application file for complete search history.

(56) References Cited

U.S. PATENT DOCUMENTS

| | | | | |
|---|---|---|---|---|
| 4,216,092 A | * | 8/1980 | Shalhoob et al. | 210/222 |
| 4,407,719 A | | 10/1983 | Van Gorp | |
| 4,455,229 A | * | 6/1984 | Sanderson et al. | 210/222 |
| 4,485,012 A | | 11/1984 | Ehresmann | |
| 4,662,314 A | * | 5/1987 | Moore, Jr. | 122/379 |
| 4,946,590 A | | 8/1990 | Hertzog | |
| 5,055,189 A | | 10/1991 | Ito | |
| 5,573,664 A | * | 11/1996 | Kuo | 210/222 |
| 5,675,153 A | | 10/1997 | Snowball | |
| 5,965,093 A | | 10/1999 | Adams | |
| 6,203,710 B1 | | 3/2001 | Woodbridge | |
| 6,716,346 B1 | * | 4/2004 | Chang | 210/222 |
| 6,812,707 B2 | * | 11/2004 | Yonezawa et al. | 324/326 |
| 2003/0168393 A1 | * | 9/2003 | Tsunematsu | 210/222 |
| 2006/0131223 A1 | | 6/2006 | Hou et al. | |
| 2008/0202652 A1 | * | 8/2008 | Takayama et al. | 148/612 |
| 2009/0242407 A1 | * | 10/2009 | Shiga | 204/557 |
| 2010/0176045 A1 | * | 7/2010 | Oshana | 210/223 |
| 2010/0264645 A1 | * | 10/2010 | Jones et al. | 285/105 |

FOREIGN PATENT DOCUMENTS

DE 19509925 A1 * 10/1996

* cited by examiner

*Primary Examiner* — Bryan D. Ripa
(74) *Attorney, Agent, or Firm* — Michael J. Feigin, Esq.; Feigin & Associates, LLC (57) ABSTRACT

A water treatment system, comprising a plurality of pipes, each of the plurality of pipes formed of a rare earth metal alloy and configured for water passage therethrough in a water flow direction wherein excitation of electrons in the rare earth metal alloy of at least one pipe in the plurality of pipes forms an electric field along the at least one pipe, the electric field having a direction perpendicular to the water flow direction in the at least one pipe, and a plurality of permanent magnets configured to create a magnetic field along the at least one pipe, the magnetic field having a direction perpendicular to the water flow direction of the at least one pipe, wherein the electric field and the magnetic field are configured to break at least some hydrogen bonds between water molecules of water passing through the at least one pipe.

20 Claims, 5 Drawing Sheets

WATER TREATMENT DEVICE AND METHOD

FIELD OF THE DISCLOSED TECHNOLOGY

The disclosed technology relates generally to devices for water treatment, and more specifically to water treatment devices based on electric and magnetic fields.

BACKGROUND OF THE DISCLOSED TECHNOLOGY

Processes for treating water in order to make it more acceptable for a desired end-use are well known, and are used in many fields, such as sewage treatment, agricultural waste water treatment, and industrial waste water treatment. In general, the goal of water treatment processes is to remove existing contaminants from the water, or at least to reduce the contaminant concentration in the water, so that the water becomes suitable for a desired end-use, such as returning the water to nature without adverse ecological impact.

Industrial waste water treatment includes two main types of processes, boiler water treatment and cooling water treatment. Proper water treatment is crucial, as lack of proper water treatment can affect various aspects of water treatment and use, from public health issues (e.g. poor quality dirty water can become breeding ground for bacteria such as Legionella) to energy efficiency and safety of machinery.

Specifically, steam boilers may suffer from scale deposits on the walls of the boiler and/or pipes, particularly because there are no specific requirements regarding the quality of the water used in such boilers. The thermal conductivity coefficient of scale deposit is one hundred times smaller than that of metals, and the thermal resistance of such deposits is high. The large thermal resistance and low thermal conductivity coefficient cause heat loss from the system resulting in excessive fuel consumption. On the other hand, the metal walls on which the scale is deposited become overheated, which may lead to pipes bulging and even bursting.

Typically, removal of scale deposits requires shutdown of the boilers and associated systems. Additionally, scale deposits are removed using sharp metal instruments. As a result, scale deposit removal involves labor, materials, and at times causes mechanical damages and/or chemical erosion to the boilers and pipes.

Though the composition of scale deposits is complex and dependent on the contaminants present in the water, often times at least part of the scale deposit is formed of carbonate materials deposited on the boiler body, such as calcium carbonate ($CaCO_3$) and magnesium carbonate ($MgCO_3$). A secondary scale deposit is often formed by alkaline metal residuals attaching to an existing deposit. Scale deposit formation can be described by the following chemical equations:

As seen from the equations, the level of chemical reactivity of water molecules affects the equilibrium of the equations. Thus, highly chemically reactive water can prevent the formation of scale, and can even cause the removal of existing scale deposits from the boiler. However, natural water is not highly chemically reactive.

Water molecule clusters are formed because the negative charges in the oxygen atoms in a water molecule are not completely neutralized when combined with hydrogen atoms to form water molecules. As a result, water molecules in a given sample will include a certain amount of oxygen atoms bearing a negative charge. Such negatively charged oxygen atoms which attract hydrogen atoms of neighboring water molecules, and form hydrogen bonds therewith. Water molecules that are bonded together via hydrogen bonds form water molecule clusters, defined chemically by the formula $(H_2O)_n$.

Water molecule clusters tend to be inertial in their physical properties and chemical reactivity, and typically do not break apart even when encountering highly active substances in nature. This feature of the water keeps it stable in the environment. Furthermore, destruction of hydrogen bonds is extremely endothermic, and requires a large amount of heat to be added to the water before the hydrogen bonds are broken and the water becomes more chemically reactive.

As a result, there is a need for a more energy efficient method of breaking up water clusters, particularly for use in water treatment facilities such as water treatment boilers. While attempts have been made to provide methods for increasing the reactivity of water molecules, these attempts continue to involve the investment of large amount of energy from an external source and require large power consumption.

SUMMARY OF THE DISCLOSED TECHNOLOGY

The disclosed technology relates generally to devices for water treatment, and more specifically to water treatment devices based on electric and magnetic fields.

More specifically, the disclosed technology provides a technical solution for reducing scale accumulation in boilers, and removal of scale deposits from boilers without resorting to use of harsh chemicals. Additionally, the disclosed technology provides a method for breaking down hydrogen bonds in boiler water, thereby reducing the energy required for operation of boilers.

In accordance with some aspects of an embodiment of the teachings herein, there is provided a water treatment system comprising a plurality of pipes, each of the plurality of pipes formed of a rare earth metal alloy and configured for water passage through the pipe in a water flow direction. Excitation of electrons in the rare earth metal alloy of at least one of the pipes forms an electric field along the pipe, the electric field having a direction perpendicular to the water flow direction in that pipe.

Additionally, a plurality of permanent magnets are arranged so as to create a magnetic field along the pipe, the magnetic field having a direction perpendicular to the direction in which water flows through the pipe.

As a result of the presence of the electric field and the magnetic field, at least some hydrogen bonds between water molecules of water passing through the pipe are broken.

In some embodiments, at least two pipes in the plurality of pipes lie parallel to one another.

In some embodiments, at least one of the pipes comprises a plurality of longitudinal segments having a first diameter. The segments are connected to one another by a plurality of ridges having a second diameter, the second diameter (the diameter of the ridges) being greater than the first diameter (the diameter of the segments). Thus, at least one of the pipes has the shape of a bamboo stalk.

In some embodiments, the excitation of the electrons in the rare earth metal alloy is caused by the magnetic field and the force it applies to the rare earth metal alloy. In some embodiments, no external power source is used for the excitation of the electrons in the rare earth metal alloy.

In some embodiments, at least some water molecules are grouped in water clusters having a first size before entering the plurality of pipes. The break of at least some hydrogen bonds, occurring in the pipes, results in at least some of the water molecules exiting the pipes being grouped in water clusters having a second size, which is smaller than the first size. Stated differently, the electric and magnetic forces applied to the water passing through the pipes breaks down water clusters, such that water leaving the plurality of pipes, after exposure to the electric and magnetic fields, includes smaller clusters than it included prior to entering the pipes.

In some embodiments, exposure of water molecules to the electric and magnetic fields while passing through the pipes increases the chemical reactivity of at least some of the water molecules. In some embodiments, the increase in chemical reactivity of some water molecules results in reduced scale sedimentation in a boiler into which the water flows from the plurality of pipes. In some embodiments, the increase in chemical reactivity of some water molecules results in removal of scale sedimentation from a boiler into which the water flows from the plurality of pipes.

In some embodiments, the permanent magnets are arranged such that they form a permanent magnet layer surrounding each of the plurality of pipes.

In some embodiments, the permanent magnets are arranged in at least two permanent magnet layers forming a matrix. Each of the permanent magnet layers in the matrix defines a magnetic field, such that the magnetic fields in the matrix apply force in alternating directions. Stated differently, the magnetic fields generated by each pair of adjacent permanent magnet layers in the matrix, apply a force in opposite directions.

DETAILED DESCRIPTION OF EMBODIMENTS OF THE DISCLOSED TECHNOLOGY

Embodiments of the disclosed technology include a water treatment device, using magnetic and electric fields.

In accordance with aspects of some embodiments of the teachings herein, there is provided a water treatment system, comprising:

a plurality of pipes, each of the plurality of pipes formed of a rare earth metal alloy and configured for water passage therethrough in a water flow direction wherein excitation of electrons in the rare earth metal alloy of at least one pipe in the plurality of pipes forms an electric field along the at least one pipe, the electric field having a direction perpendicular to the water flow direction in the at least one pipe; and a plurality of permanent magnets configured to create a magnetic field along the at least one pipe, the magnetic field having a direction perpendicular to the water flow direction of the at least one pipe;

wherein the electric field and the magnetic field are configured to break at least some hydrogen bonds between water molecules of water passing through the at least one pipe.

In accordance with aspects of some embodiments of the teachings herein, there is provided a method for water treatment, the method carried out by way of:

passing water through a plurality of pipes, each of the plurality of pipes being formed of a rare earth metal alloy;

forming an electric field along at least one pipe of the plurality of pipes by causing excitation of electrons in the rare earth metal alloy forming the at least one pipe, the electric field having a direction perpendicular to a direction of water flow through the at least one pipe; and creating a magnetic field by placing a plurality of permanent magnets along the at least one pipe, the magnetic field having a direction perpendicular to the direction of water flow through the at least one pipe;

wherein the electric field and the magnetic field are configured to break at least some hydrogen bonds between water molecules of water passing through the at least one pipe.

Figure 1:
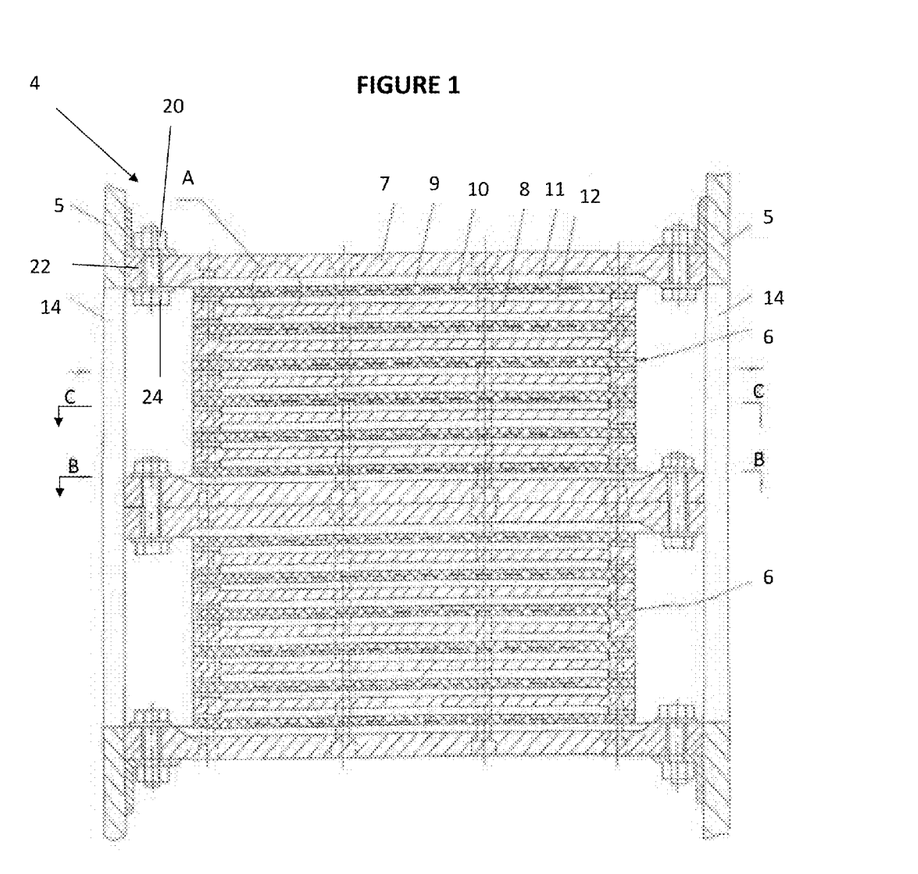
FIG. 1 is a schematic illustration of an embodiment of a water treatment device constructed and operative in accordance with an embodiment of the teachings herein.
Figure 2:
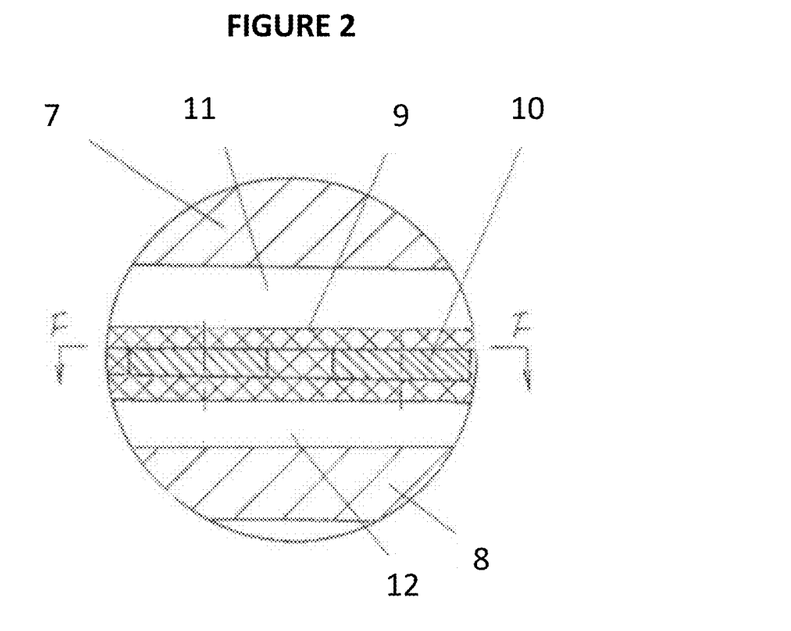
FIG. 2 is an enlarged schematic illustration of area A of FIG. 1.

Reference is now made to FIG. 1, which is a schematic illustration of an embodiment of a water treatment device constructed and operative in accordance with an embodiment of the teachings herein, and to FIG. 2, which is an enlarged schematic illustration of area A of FIG. 1

As seen in FIG. 1, a water treatment device 4 comprises a plurality of water treatment components 6, which are assembled together by means of connectors. Each water treatment component 6 comprises a pair of single faced, magnetically permeable channel plates 7, arranged, respectively, at the top and the bottom of water treatment component 6. Plates 7 are attached, at respective ends thereof, to two partition boards 5, each including an opening 14. It is appreciated that, when assembled, the edges of water treatment components 6 face openings 14 of partition boards 5, and are flush therewith.

As seen with particular clarity in FIG. 2, each pair of plates 7 has a plurality of double faced magnetically permeable channel plates 8 arranged therein. The number of double faced magnetically permeable channel plates 8 may be any suitable number, as determined by the size of water treatment device 4. As seen, in the embodiment illustrated in FIG. 1, five double faced magnetically permeable channel plates 8 are deployed.

Single faced magnetically permeable channel plates 7, and double faced magnetically permeable channel plates 8, are formed of a rare earth metal alloy, typically including rare earth metals cast iron, which has excellent magnetic conductivity. In some exemplary embodiments, the alloy is formed by adding to every 100 Kilograms of Iron (Fe), 24.52 grams of Lanthanum (La), 0.96 grams of Yttrium (Y), 58.16 grams of Cerium (Ce), 5.07 grams of Praseodymium (Pr), 11.85 grams of Neodymium (Nd), 1.63 grams of Samarium (Sm), 0.12 grams of Titanium (Ti), and 0.5 grams of Zinc (Zn).

It is appreciated that single faced magnetically permeable channel plates 7 and double faced magnetically permeable channel plates 8 typically operate in an oxygen-free environment, the alloy used to form the plates 7 and 8 will not rust, as described further hereinbelow.

Figure 3:
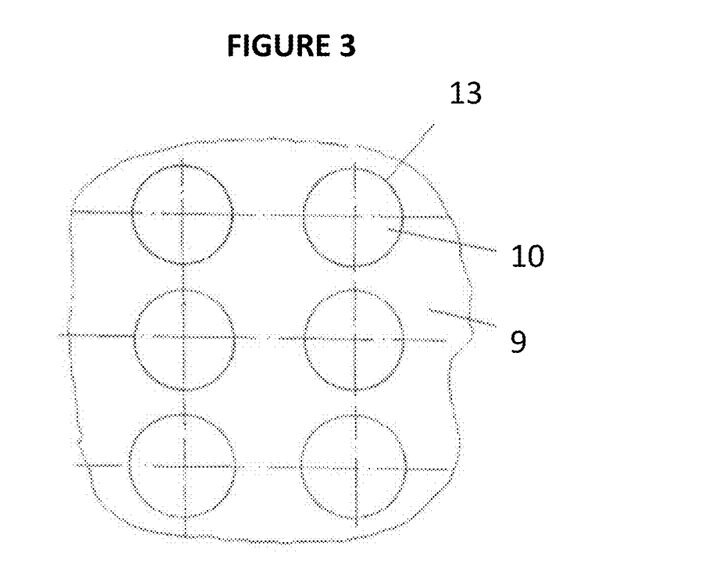
FIG. 3 is a sectional illustration, taken along section lines F-F in FIG. 2.

As seen in FIGS. 1, 2, and 3, between each pair of plates 8, as well as between the end channel plates 8 and the adjacent channel plates 7 is located a plastic clapboard 9 having permanent magnets 10 enclosed within. Specifically, each plastic clapboard 9 is in fact formed of three, typically identical, heat-resisting plastic boards, which are bonded together to form a clapboard 9. A central one the plastic boards includes magnet cavities 13 for placement of permanent magnets 10 therein, such that permanent magnets 10 are sandwiched between two plastic boards, and are surrounded by plastic from all directions. The intervals between permanent magnets 10, within a clapboard 9, are typically small, for example in the range of 10 to 12 mm.

Figure 4:
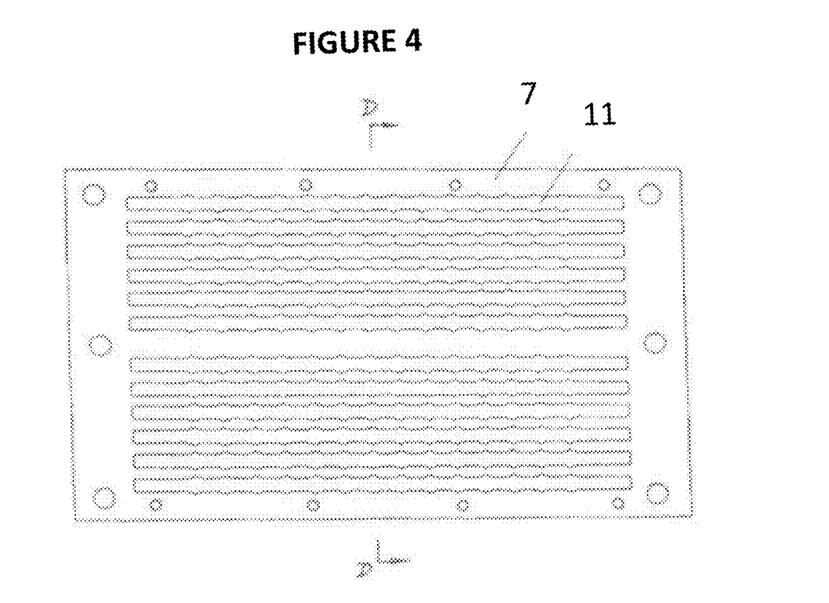
FIG. 4 is a scaled-down sectional illustration, taken along section lines B-B in FIG. 1.
Figure 5:
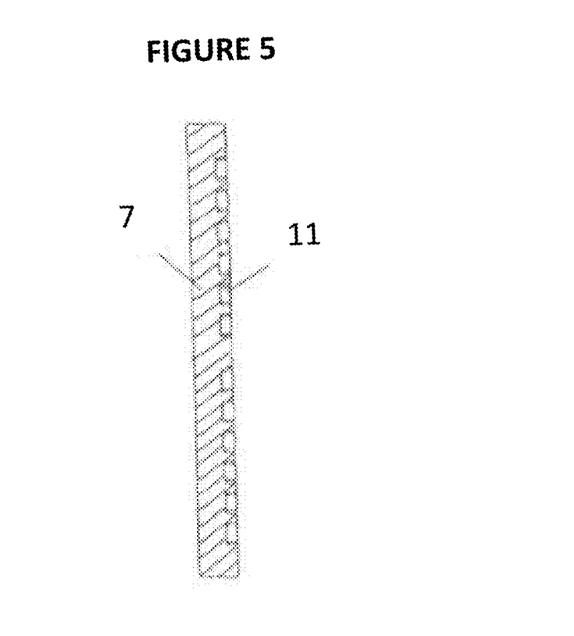
FIG. 5 is a sectional illustration, taken along section lines D-D in FIG. 4.
Figure 6:
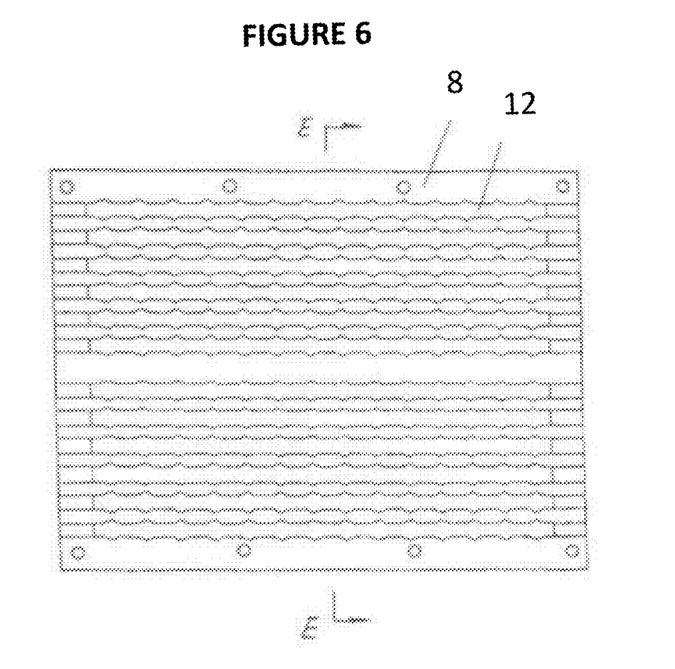
FIG. 6 is a scaled-down sectional illustration, taken along section lines C-C in FIG. 1.
Figure 7:
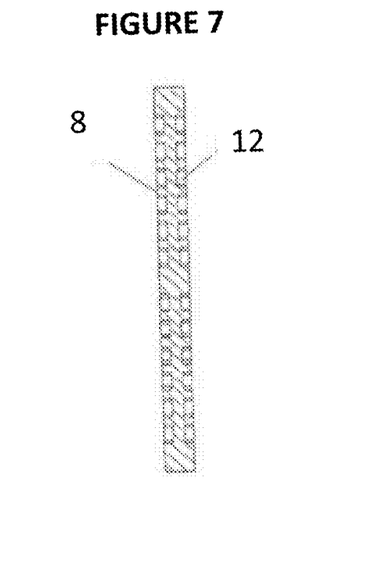
FIG. 7 is a sectional illustration, taken along section lines E-E in FIG. 6.

Reference is now additionally made to FIG. 4, which is a sectional illustration taken along section lines B-B in FIG. 1, to FIG. 5, which is a sectional illustration taken along section lines D-D in FIG. 4, to FIG. 6, which is a sectional illustration taken along section lines C-C in FIG. 1, and to FIG. 7, which is a sectional illustration taken along section lines E-E in FIG. 6.

As seen in FIGS. 2, 4, and 5, a plurality of pipes, or longitudinal water channels 11, are embedded in the inner face of each single-faced magnetically permeable channel plate 7. Additionally, as clearly seen in FIGS. 2, 6, and 7, a plurality of pipes, or longitudinal water channels 12 are embedded in each of the faces of each double-faced magnetically permeable channel plate 8. Together, water channels 11 and 12, and plates 7 and 8, form a magnetically permeable split-flow core for a water treatment facility.

The number of water channels 11 in each single faced magnetically permeable channel plate 7 may be any suitable number, and may vary between different plates 7. Similarly, the number of water channels 12 in each face of each double faced magnetically permeable channel plate 8 may be any suitable number, and may vary between different plates 8 and even between the two faces of a single plate 8. In some embodiments, the number of water channels 11 or 12 placed in a face of a plate 7 or 8 is dependent on the volume of water to be treated. As seen in FIGS. 4 to 7, in the illustrated embodiment twelve water channels are placed in the face of each plate.

The water channels 11 and 12 may have any suitable shape. That said, in some embodiments, water channels 11 and/or 12 are formed of longitudinal segments having a first diameter, connected by ridges having a second diameter, the second diameter being slightly greater than the first diameter, thereby forming a shape similar to that of a bamboo stalk. Forming water channels 11 and/or 12 in the shape of a bamboo stalk is advantageous because the bamboo-shaped (bent) channel forms and generates the water inrush function (velocity and acceleration) within the channel. The slower water flow allows the water to be treated more effectively than the water moving in a straight channel under the same conditions as the constant water flow.

As seen in FIG. 2, the locations of permanent magnets 10, formed in plastic clapboards 9, correspond to the locations of water channels 11 and 12. Specifically, in some embodiments, permanent magnets 10 are disposed in magnet cavities 13 along water channels 11 and 12. In some embodiments, permanent magnets 10 are longitudinally arrayed such that their directions alternate in pairs, for example in the form of N—S, S—N, N—S, S—N, etc.

As seen in FIG. 1, single faced magnetically permeable channel plates 7, double faced magnetically permeable channel plates 8, and plastic clapboards 9, are tightly fastened together using bolts 20 passing through mounting holes 22 located at edges of water treatment device 4, and nuts 24.

Figure 8:
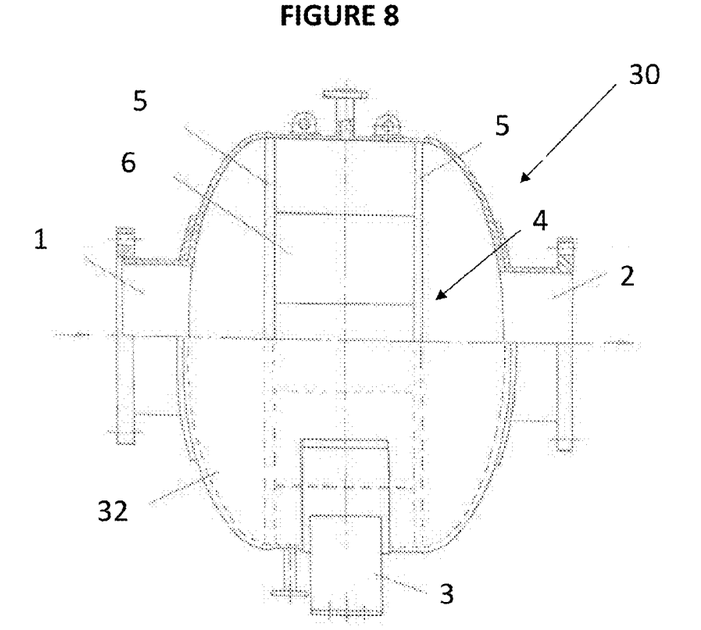
FIG. 8 is a cutaway, schematic illustration, of an embodiment of a flat plate water treatment system using the water treatment device of FIGS. 1-7, constructed and operative according to an embodiment of the teachings herein.

Reference is now made to FIG. 8, which is a cutaway, schematic illustration, of an embodiment of a flat plate water treatment system using the water treatment device of FIGS. 1-7, constructed and operative according to an embodiment of the teachings herein.

A water treatment device 4, as described hereinabove with reference to FIGS. 1-7 is used in forming a flat plate water treatment system 30. As seen, a water treatment device 4 is mounted within a tank body 32, as seen in FIG. 8. Tank body 32 further includes a water inlet 1, configured for water to enter water treatment system 30, a water outlet 2, configured for treated water to exit water treatment system 30, and a pedestal 3.

It is appreciated that tank 32 may include one or more water treatment devices 4, and that each of those water treatment devices may include one or more water treatment components 6. That said, as an example, the illustrated embodiment shows a single water treatment device 4, including two partition boards 5 and two water treatment components 6.

Referring now to FIGS. 1 to 8, in use, boiler water is fed into tank body 32 via water inlet 1. The water flows through each of water channels 11 and 12 in plates 7 and 8, and then flows out of the tank 32 via water outlet 2. Typically, water flowing out of tank 32 flows into a boiler, via tubes connecting tank 32 with the boiler.

Magnetic forces from permanent magnets 10 affect the outer shell electrons of the alloy forming magnetically permeable plates 7 and 8 and the channels 11 and 12 therein. Thus, the outer shell electrons continuously move between an excited state and the ground state, thereby releasing energy to aid in the water treatment process.

As mentioned hereinabove, permanent magnets 10 are arranged in cavities 13 within clapboards 9 such that their locations correspond to water channels 11 and 12, and form a magnetic field within tank 32, in a direction perpendicular to the direction of water flow. Additionally, as mentioned above, plates 7 and 8 and water channels 11 and 12 are formed of an alloy having excellent magnetic conductivity, result in release of energy by transition of electrons between an excited state and a ground state. As such, an electric field formed in water channels 11 and 12 is self excited, and creation of the electric field does not require any external energy input.

The energy released by the magnetic field and from the transition of electrons between states, impinges on water clusters in the water flowing through channels 11 and 12, and breaks at least some of the hydrogen bonds in the water clusters thereby reducing the size of the water clusters. The broken water clusters do not recombine due to the polarization of the magnetic field generated by permanent magnets 10.

The reduction in the size of water clusters, and in the number of hydrogen bonds in each water cluster, boosts the physicochemical activity of the water clusters. The increase in energy in the system causes and increase in resonance internal energy of water molecules flowing through the system, thereby causing the water molecules to flow faster (increased thermal motion) and to have higher chemical reactivity. Thus, when the water exits tank 32 and enters the boiler it is highly chemically reactive, and has smaller water clusters.

When considering the chemical reactions through which water scale is formed:

water with increased chemical reactivity will cause the reaction to be carried out in the forward direction more readily than in the reverse direction, thereby shifting the chemical equilibrium and causing reduced scale formation, and possibly the breakdown of at least some scale. Additionally, in some embodiments, the concentration of sodium ions in treated water is reduced.

As a result, water and steam treated by the system and method of the teachings herein are purified, and cause less scaling and/or discharge in boilers, up to a level of zero discharge. The reduction in scale deposits greatly reduces boiler maintenance costs, since there is no need to remove old scale deposits from the boilers which may harm the boiler, no need for acid cleaning of the boiler, boiler accident caused by scale are prevented, the operating pressure of the boilers is reduced, and the application of coal is improved.

Additionally, experimental results show that using the water treatment system of the teachings herein greatly improves boiler operation and productivity. For example, coal consumption may be reduced by approximately 3 g/kilowatt-hour or 3%, boiler outputs may be improved by approximately 7%, steam flow may be reduced by 3-8%, and power consumption may be reduced by 1%. Improvements may be found in many other parameters of boiler function as well.

Figure 9:
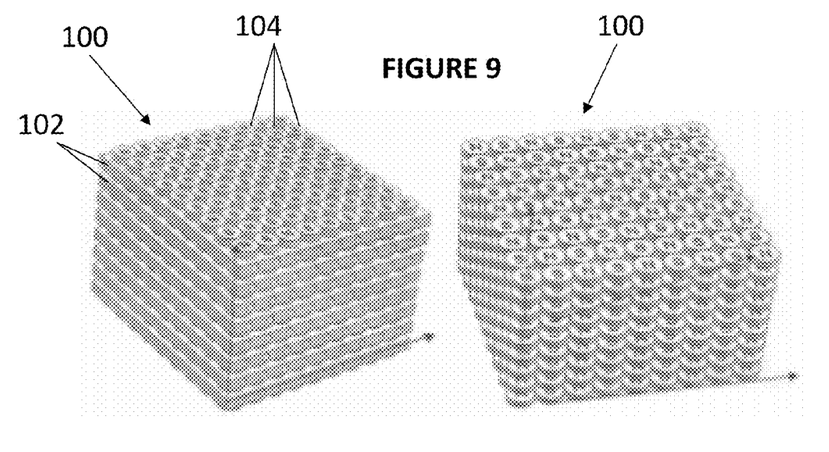
FIG. 9 is a schematic illustration of an embodiment of a water treatment device based on a three dimensional magnetic plate, constructed and operative in accordance with another embodiment of the teachings herein.

Reference is now made to FIG. 9, which is a schematic illustration of an embodiment of a water treatment device based on a three dimensional magnetic plate, constructed and operative in accordance with another embodiment of the teachings herein.

As seen, a magnetic array 100 comprises a plurality of magnetic plates 102, each of the magnetic plates including an array of permanent magnets 104. The magnets 104 in each plate 102 are arranged in alternating N—S order, both in the rows of the array and in the columns. Thus, the magnetic array 100 creates alternating three-dimensional magnetic fields.

When water molecules pass through magnetic array 100, typically around the array or between magnets 104 forming the array 100, they undergo mutations and/or chemical reactions, as do other molecules passing through this type of magnetic environment. This feature of the magnetic array 100 makes it useful for generating a magnetic field in water treatment facilities similar to those described hereinabove with reference to FIGS. 1 to 8.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method for water treatment, the method carried out by way of:
   passing water through a plurality of channels in a direction of water flow, each of said plurality of channels being embedded in a surface of at least one magnetically permeable channel plate including a rare earth metal alloy; and
   creating a magnetic field by placing a plurality of permanent magnets to form at least one permanent magnet layer adjacent to an exterior side of said at least one magnetically permeable channel plate, said magnetic field having a direction perpendicular to said direction of water flow through at least one channel of said plurality of channels;
   wherein said magnetic field breaks at least some hydrogen bonds between water molecules passing through said at least one channel of said plurality of channels.

2. The method of claim 1, also comprising, prior to said passing, embedding at least two channels in said plurality of channels parallel to one another in a single said magnetically permeable channel plate.

3. The method of claim 1, wherein at least one of said plurality of channels comprises a plurality of longitudinal segments having a first diameter, said segments being connected by a plurality of ridges having a second diameter, said second diameter being greater than the first diameter.

4. The method of claim 1, wherein prior to said passing at least some water molecules to be passed through said plurality of channels are grouped in clusters having a first size, and wherein said break of said at least some hydrogen bonds results in at least some water molecules exiting said plurality of channels being grouped into clusters having a second size following said passing, said second size being smaller than said first size.

5. The method of claim 1, also comprising increasing chemical reactivity of at least some water molecules passing through at least one of said plurality of channels.

6. The method of claim 5, wherein said increasing said chemical reactivity results in reduced scale sedimentation in a boiler into which water flows from said plurality of channels.

7. The method of claim 5, wherein said increasing said chemical reactivity results in removal of scale sedimentation from a boiler into which water flows from said plurality of channels.

8. The method of claim 1, wherein said placing said at least one permanent magnet layer is formed on an exterior surface of each of said plurality of channels.

9. The method of claim 1, also comprising arranging said plurality of permanent magnets in at least two permanent magnet layers forming a matrix, each of said at least two permanent magnet layers comprising some of said plurality of permanent magnets arranged in alternating North-South order in the rows and columns of said at least two permanent magnet layers, wherein said at least two permanent magnet layers are configured to generate magnetic fields between said at least two permanent magnet layers, and wherein the magnetic fields generated by said at least two permanent magnet layers apply force in alternating directions.

10. The method of claim 8, wherein said placing said plurality of permanent magnets to form said at least one permanent magnet layer comprises enclosing said plurality of permanent magnets in magnet cavities within a plastic clapboard, and placing said plastic clapboard parallel to said at least one magnetically permeable channel plate.

11. A water treatment system comprising:
   a plurality of channels, each of said plurality of channels being embedded in a surface of at least one magnetically permeable channel plate including a rare earth metal alloy and configured for water passage therethrough in a water flow direction; and
   a plurality of permanent magnets forming at least one permanent magnet layer, said at least one permanent magnet layer adjacent to an exterior side of said at least one magnetically permeable channel plate, said plurality of permanent magnets creating a magnetic field having a direction perpendicular to said water flow direction of at least one channel of said plurality of channels;

wherein said magnetic field breaks at least some hydrogen bonds between water molecules passing through said at least one channel of said plurality of channels.

12. The system of claim 11, wherein at least two channels in said plurality of channels are embedded in a single said magnetically permeable channel plate and lie parallel to one another therein.

13. The system of claim 11, wherein at least one of said plurality of channels comprises a plurality of longitudinal segments having a first diameter, said segments being connected by a plurality of ridges having a second diameter, said second diameter being greater than the first diameter.

14. The system of claim 11, wherein at least some water molecules entering said plurality of channels are grouped in clusters having a first size, and wherein said break of said at least some hydrogen bonds results in at least some water molecules exiting said plurality of channels being grouped into clusters having a second size, said second size being smaller than said first size.

15. The system of claim 11, wherein said magnetic field increases chemical reactivity in at least some water molecules passing through at least one of said plurality of channels.

16. The system of claim 15, wherein said increase in said chemical reactivity of said at least some water molecules results in reduced scale sedimentation in a boiler associated with said water treatment system.

17. The system of claim 15, wherein said increase in said chemical reactivity of said at least some water molecules results in removal of scale sedimentation from a boiler associated with said water treatment system.

18. The system of claim 11, wherein said at least one permanent magnet layer is formed on an exterior surface of each of said plurality of channels.

19. The system of claim 11, wherein said plurality of permanent magnets are arranged in at least two permanent magnet layers forming a matrix, each of said at least two permanent magnet layers comprising some of said plurality of permanent magnets arranged in alternating North-South order in the rows and columns of said at least two permanent magnet layers, wherein said at least two permanent magnet layers are configured to generate magnetic fields between the layers, and wherein the magnetic fields generated by said at least two permanent magnet layers apply force in alternating directions.

20. The system of claim 18 wherein said plurality of permanent magnets are enclosed in magnet cavities within a plastic clapboard to form said at least one permanent magnet layer, and said plastic clapboard lies parallel to said at least one magnetically permeable channel plate.

* * * * *